Oct. 31, 1967 R. S. HAYDOCK 3,349,426
HOODED CASTER WHEEL ASSEMBLY
Filed July 26, 1966 2 Sheets-Sheet 1

Inventor.
Raymond S. Haydock
by Robert H. Wendt.
Attorney.

Oct. 31, 1967 R. S. HAYDOCK 3,349,426
HOODED CASTER WHEEL ASSEMBLY
Filed July 26, 1966 2 Sheets-Sheet 2

Inventor.
Raymond S. Haydock.
by Robert H. Wendt.
Attorney.

United States Patent Office 3,349,426
Patented Oct. 31, 1967

3,349,426
HOODED CASTER WHEEL ASSEMBLY
Raymond S. Haydock, Niles, Ill., assignor of one-half each to Raymond Haydock, Jr., and Sandra L. Haydock, both of Niles, Ill.
Filed July 26, 1966, Ser. No. 568,063
4 Claims. (Cl. 16—46)

The present invention relates to a floating caster wheel and method of making it, and is particularly concerned with wheels which are light in weight and simple in construction.

One of the objects of the invention is the provision of an improved caster wheel assembly, and/or method of making it, which is so light in weight that it will float in water, by virtue of the fact that the inner housing is hollow, and impervious, and made of plastic which is light in weight.

Another object is the provision of such an improved caster wheel, and method, that it includes a minimum number of parts, comprising a two part inner housing, and an outside tread part, the former being made of linear polyethylene plastic, having lubricating characteristics, with a central bore for receiving the stem of a fork, and the latter being made of ethylene vinyl acetate, which is molded and secured permanently on the inner housing, the assembly weighing only a few ounces, and being so light that it will float in water.

Another object is the provision of such an improved caster wheel assembly, and method of making it, that involves a more simple construction, a minimum number of parts, a minimum number of steps in the method of its manufacture, a minimum weight because of its hollow inner housing, and a most economical construction, so that they can be produced at such a low cost, that is within the range of a vast number of purchasers.

Another object of the invention is the provision of an improved hooded fork caster assembly, in which the outer housing of the floating caster wheel is provided with an axle, having a cylindrical body, which is provided with an annular groove and a head flange at each end, and the axle is mounted in a half-open groove, located in the side flanges of a hooded fork, supporting the caster wheel in the fork, which has an upwardly extending cylindrical body with a lower raceway at its top, provided with an opposite upper raceway, and a multiplicity of balls permanently and rotatably secured together, and the upper raceway has an upper centrally located pintle or stem, with a threaded end to be mounted in an article of furniture.

Another object is the provision of an improved method of making such a caster assembly, including the mounting of the caster wheel on an axle, carried by the forked hood as described.

Figures 1, 2, 3:
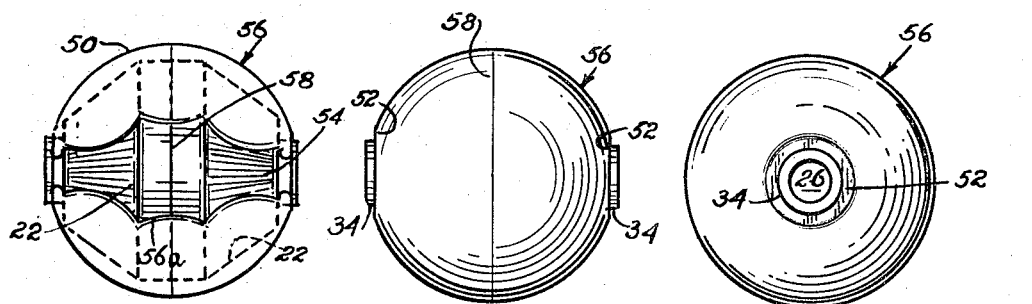
Figures 4, 5, 6:
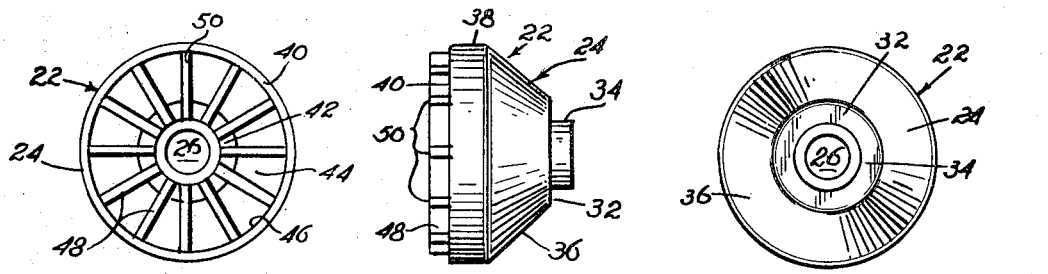
Figures 7, 8, 9:
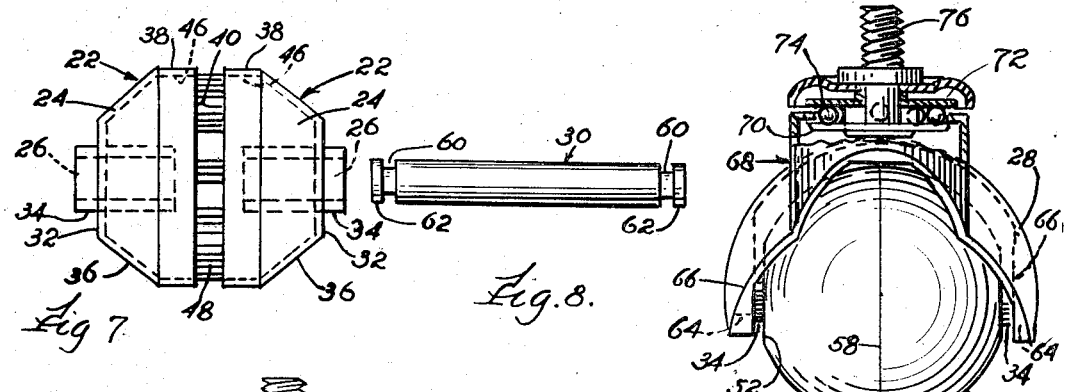
Figure 10:
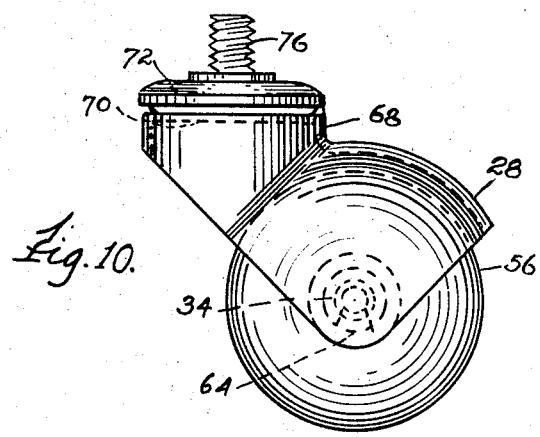
Figure 11:
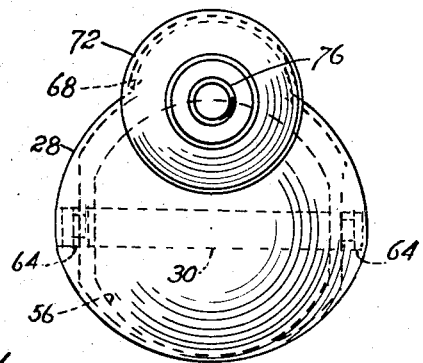
Figure 12:
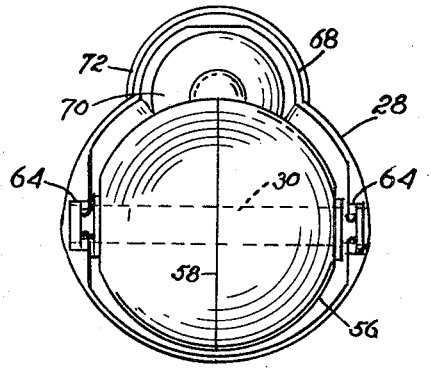

Referring to the drawings:
FIG. 1 is a top plan view of the floating caster wheel;
FIG. 2 is a bottom plan view;
FIG. 3 is an end elevational view;
FIG. 4 is an end elevational view of the inner housing;
FIG. 5 is a side elevational view of the same;
FIG. 6 is a rear elevational view;
FIG. 7 is an exploded view of the inner housing, in the process of its assembly;
FIG. 8 is an elevational view of the axle;
FIG. 9 is a rear elevational view of the floating caster wheel;
FIG. 10 is a side elevational view;
FIG. 11 is a top plan view; and
FIG. 12 is a bottom plan view.

The present invention includes two equivalent forms, the assembly of FIG. 1, in which the outer tread part 56, only partially covers the inner housing 22, leaving an opening 54, with curved edges 56, and the line 58 indicates the flash at the juncture of the mold parts, which is left on the tread part 50; and the other form shown in FIG. 2, which shows an outer tread part 56, completely covering the inner housing 22, and this view is also the same as the rear of FIG. 1.

The inner housing 22 is preferably made of linear polyethylene and the outer tread part is made of ethylene vinyl acetate.

The body 24 of the inner housing 22 has a central bore 26 adapted to receive the stem of a caster wheel, fork 28, and the two identical bodies are hollow.

The body 24 has a plane outer end surface 32 of circular shape surrounding a short cylindrical stem tube 24, which tube extends to the surface 32, and the body has a frusto-conical surface 36 extending outward to a narrow peripheral surface 38 which terminates in a plane edge 40.

This plane edge 40 is adapted to abut against a similar edge 40 on the other of two parts 22, 22 of the body 24.

The interior of the body 24 has an inner plane surface 42, an inner frusto-conical surface 44, and an inner cylindrical surface 46, and the body has a multiplicity of integral, radially extending, thin, reinforcing vanes 48, spaced from each other. There are twelve such vanes in one example of the invention, but the number may be varied.

Each vane extends from the inner plane surface 42, from the inner frusto-conical surface 44, and from the inner cylindrical surface 46 to their outer edges 50, which are all in the same plane. The vanes project axially from the body 24, by an amount which is slightly less than the axial dimension of the inner cylindrical surface 46, in which the vanes on one part 22, fit on the other part 22.

Thus, the vanes 48 on one body may be located between the vanes 48 on the other body and the two parts 22, may be caused to slight together, and the radial outer edges of the projecting vanes 50, fit against the inner cylindrical surface 46, and the clearance is so slight, so that the two parts snap together, and can only be separated by a knife or a screw driver.

After the two identical parts 22, 22, of the inner housing, have been snapped together, they are so held by friction.

Next, a sphere 56 of plastic ethylene vinyl acetate is molded about the inner housing 22, to hold the parts in permanent assembly and the line 58 merely indicates a slight flash at the juncture of the two mold parts used in formation of the sphere, which serves as an outer tread part 56.

In some embodiments, the outer tread part 56 may cover the entire inner housing assembly 22, except the projecting stem tubes 34. The sphere preferably has a plane surface 52 at each axial end surrounding each projecting stem tube 34. Less accuracy and less waste of the outer tread material is involved if the tread part is sufficient only to cover the major portion of the inner housing, as shown in FIG. 1. Here, there is an opening 54 in the outer tread part, defined by the curved edges of the outer tread material surrounding the opening 54.

The stem 34 of the caster wheel 20 is adapted to receive the cylindrical stem or axle 30, having an annular groove 60, 60, at each end, leaving a head flange 62, 62, at each end.

The end flanges 62, 62, of the axle 30, carrying the wheel assembly 20, are mounted in the half open grooves 64, 64, located in the side flanges 66, 66, of the hooded fork 28, where they are secured by upsetting the metal at the outer part of each groove.

The hooded fork 28, has its side flanges 66, 66, curving down about the caster wheel 20, but spaced therefrom, and the flanges are supported by an upwardly extending cylindrical body 68, having a lower raceway 70, at its upper end.

The lower raceway is opposed by an upper raceway 72, having a multiplicity of balls 74, 74, in the grooves of the raceways, and the raceways have the usual half circular annular grooves, and are secured together by a central securing member (not shown). The upper raceway has a closed upper portion with a centrally located threaded pintle or stem 76, which may be secured in an article of furniture.

The improved method of making a forked hood caster wheel assembly may be briefly summarized as follows:

A cylindrical stem or axle is provided and mounted in the stem tube of the caster wheel already described, having been previously provided with an annular groove and a head flange at each end of the axle. A forked hood is made of suitable metal with a cylindrical body and depending partially spherical flanges extending about the caster wheel but spaced therefrom, and thus the caster wheel is mounted on the body and secured by upsetting the metal of the side flanges outside the axle. The forked hood is provided with a lower raceway secured to an upper raceway with a multiplicity of balls in the raceways, and the upper raceway is provided with a centrally located upwardly projecting pintle or stem 76 which is threaded to be secured to an article of furniture. This pintle or stem may take any of the conventional forms for its securement to the furniture.

The method of making the floating caster wheel assembly, which comprises a series of new steps, is briefly outlined as follows:

First, forming an inner housing, comprising two identical parts of plastic, each part comprising a body having a central bore adapted to receive the stem of a caster wheel fork, and each part being hollow and having a plane outer end surface of circular shape surrounding a short cylindrical stem tube, which extends to said surface, said body having an outer frusto-conical surface extending outward to a narrow cylindrical peripheral surface, which terminates in a plane edge adapted to abut against a similar edge on the other of two parts, the interior of said body having an inner plane surface, an inner frusto-conical surface, and an inner cylindrical surface, and forming in said body a multiplicity of integral, radially extending, reinforcing vanes, spaced from each other and extending from said inner plane surface, said inner frusto-conical surface, and said inner cylindrical surface, said vanes projecting axially beyond said inner and outer cylindrical surfaces, and terminating in plane edges and projecting by an amount which is slightly less than the axial length of the inner cylindrical surface on the other part of the inner housing, and causing the fit of the two parts to be such that the two parts of the inner housing may be brought together, with the vanes of one part located between the vanes of the other part, and so proportioning the parts, that when the vanes begin to engage the inner cylindrical surfaces, the two parts permit their further movement together, with slight force and snapping them into closed position with the plane edges of the cylindrical parts engaging each other.

The method also includes the molding of a sphere of plastic about the outside of said inner housing, and extending to the plane surfaces of the sphere, at each end thereof, surrounding each stem tube, the said sphere of plastic forming an outer tread part, permanently assembled on the inner housing, and it also includes the inner housing being made of linear polyethylene, and the outer tread part of ethylene vinyl acetate.

Thus, the outer tread part holds the inner housing together, and makes an assembly that has superior strength and resiliency, and is so light in weight that it will float in water.

While I have illustrated and described a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by United States Letters Patent, is:

1. A floating caster wheel assembly, comprising an inner housing, having two identical parts of molded plastic, each part comprising a body having a central bore adapted to receive the stem of a caster wheel fork, and each part being hollow and having a plane outer end surface of circular shape surrounding a short cylindrical stem tube, which extends to said surface, said body having an outer frusto-conical surface extending outward to a narrow cylindrical peripheral surface which terminates in a plane edge, adapted to abut against a similar edge on the other of two parts, the interior of said body having an inner plane surface, an inner frusto-conical surface and an inner cylindrical surface, and said body having a multiplicity of integral radially extending, reinforcing vanes, spaced from each other and extending from said inner plane surface, said inner frusto-conical surface, and said inner cylindrical surface, said vanes projecting axially beyond said inner and outer cylindrical surfaces and terminating in plane edges, and projecting by an amount which is slightly less than the axial length of the cylindrical inner surface on the other part of the inner housing, the fit of the two parts being such that the two parts of the inner housing may be brought together with the vanes of one part located between the vanes of the other part, and when the vanes begin to engage the inner cylindrical surface, the two parts permit their further movement together with slight force, and snap into closed position with the plane edges of the cylindrical parts engaging each other.

2. A floating caster wheel assembly, according to claim 1, in which the inner housing has a sphere of plastic molded about the outside of said inner housing, and extending to two plane surfaces on the sphere, at each end thereof, surrounding each stem tube, and slightly below the end of each stem tube, the said sphere of plastic forming an outer tread part, permanently assembled on the inner housing.

3. A floating caster wheel assembly according to claim 2, in which the inner housing is made of linear polyethylene, and the outer tread part is made of ethylene vinyl acetate.

4. A hooded caster wheel assembly, according to claim 1, in which the caster wheel is supported by an axle having an annular groove at each of its ends, and a head flange on each end of the axle, said axle being supported by the depending flanges of a forked head, said head having an upwardly extending cylindrical body carrying a lower raceway, an opposing upper raceway, and a multiplicity of balls between the raceways, and a central securing member for securing said raceways together, said upper raceway being closed, and said body supporting a central axially projecting thread member for securement to an article of furniture.

No references cited.

BOBBY R. GAY, *Primary Examiner.*

D. L. TROUTMAN, *Assistant Examiner.*